Ohsawa et al.

United States Patent [19]

[11] Patent Number: 4,874,976

[45] Date of Patent: Oct. 17, 1989

[54] SPINDLE MOTOR FOR DRIVING DISCS

[75] Inventors: Masahiro Ohsawa; Eiichi Yonezawa, both of Kanagawa, Japan

[73] Assignee: Fuji Electric Co., Ltd., Kanagawa, Japan

[21] Appl. No.: 229,663

[22] Filed: Aug. 8, 1988

[30] Foreign Application Priority Data

Sep. 4, 1987 [JP] Japan .............................. 62-221483

[51] Int. Cl.⁴ ........................ H02K 1/22; H02K 21/12
[52] U.S. Cl. .............................. 310/268; 360/97.01;
310/DIG. 3; 310/68 B; 310/156
[58] Field of Search ................... 310/268, 49 R, 68 B, 310/DIG.3; 360/97

[56] References Cited

U.S. PATENT DOCUMENTS

| | | | |
|---|---|---|---|
| 4,581,667 | 4/1986 | Gerfast | 360/97 |
| 4,585,963 | 4/1986 | Wilkinson | 310/67 R |
| 4,658,312 | 4/1987 | Elsässer | 360/97 |
| 4,757,222 | 7/1988 | Shiraki et al. | 310/68 B |

Primary Examiner—Patrick R. Salce
Assistant Examiner—C. LaBalle
Attorney, Agent, or Firm—Finnegan, Henderson, Farabow, Garrett, & Dunner

[57] ABSTRACT

A spindle motor for rotating magneto-optical discs that are attracted and held on a fixed position at an end of a motor driven shaft by means of a clamping rotor with internal field magnets. The spindle motor has a set of stator coils and a set of field magnets held internally mounted on the shaft side of the clamping rotor. The field magnet and stator coil sets are arranged at a regular interval in a ring around the circumference of the clamping rotor and of a shield member of the spindle motor respectively, leaving a thin gap between the stator coils and the field magnets. The saucer-like clamping rotor is made of a non-magnetic material and applied at the disc side, on which side a magneto-optical disc is charged, of the rotary shaft. The field magnets, being fitted on the face of the clamping rotor opposed to the magneto-optical disc mounted face, function both as a means for driving the clamping rotor for motor operation, and as a disc-attracting device.

3 Claims, 2 Drawing Sheets

SPINDLE MOTOR FOR DRIVING DISCS

BACKGROUND OF THE INVENTION

1. Field of the Invention

The present invention relates to a construction of a spindle motor for use in magneto-optical disc-driving devices of information processing apparatuses.

2. Description of the Prior Art

A DC brushless type motor of an ordinary outer rotor type has generally been used in the spindle motor that rotatably drives magneto-optical discs. It is conventional that the magneto-optical discs are attracted and held at their predetermined positions by means of a magnetic disc clamping device fixed around an end of the rotary shaft of the spindle motor. The magneto-optical disc then is driven or rotated by the spindle motor.

FIG. 2 shows a construction of the spindle motor for magneto-optical disc driving according to the prior art. In the drawing, the reference numeral 1 shows a magnetic shield fixed at a side of the stator of the spindle motor, which is also used as a motor fixing frame. To the boss of the shield 1, a rotary shaft 3 is journalled through a bearing 2. A cup-like rotor yoke 4 with a central saucer-shaped section is fitted to an end of the rotary shaft 3, and the rotor yoke 4 is attached to the rotary shaft 3 by an adhesive applied to a groove 5 formed around the shaft 3. Permanent field magnets 6 are secured to the inner circumferential face of the cylindrical portion of the rotor yoke 4 in such a way that the poles of N and S are alternatively arranged. A stator 7 is arranged on the circumference of the boss of the shield 1 and the outer peripheral face of the stator 7 faces the field magnets 6 leaving a small radial gap. Hall elements 8 detect a magnet positions so as to determine the rotating angle of the rotor yoke 4. The Hall elements 8 are secured on the print substrate 9 of a control circuit at the side of the shield so as to face the axial end of the magnet 6.

The conventional DC brushless motor having the aforementioned construction has been well known. In accordance with the rotating angle determined, the control circuit controls the timing of supplying currents to the stator coil according to the predetermined order, and drives the rotor in a fixed direction and at a constant speed.

In order to drive (rotate) the magneto-optical disc held on the rotary shaft of the motor, a magnetic disc clamp 10 is installed at the end of the rotary shaft 3 extending through the shield 1. The disc clamp 10 consists of a cup-shaped clamp case 11, and a ring-shaped disc attracting magnet 12, fixed within the clamp case 11 so as to attract the magneto-optical disc. (The magneto-optical disc is held at a side end of the clamp case 11). The disc clamp 10 is firmly secured by fitting the clamp case 11 onto the rotary shaft 3 and applying an adhesive to a groove 13 formed on the rotary shaft 3. The N pole and S pole of the disc attracting magnet 12 are positioned along the axial direction of the rotary shaft 3.

The mounting operation of the magneto-optical discs on the spindle motor through the disc clamp 10 will now be explained. A mounting disc 16 of a magnetic material is attached to the magneto-optical disc 14 by means of a boss 17. Each mounting disc has a central hole 15 through which the rotary shaft 3 is inserted. The magneto-optical disc 14 is accommodated in a cassette case (not shown). First, the magneto-optical disc 14 is inserted on the rotary shaft 3 as is accommodated in the cassette case, along the direction P shown by an arrow. Then, the mounting disc 16 is attracted to the disc attracting magnet 12 of the disc clamp 10 and the surface of the magneto-optical disc 14 contacts with an end face of the clamp case 11, resulting in the fixed mounting of the magneto-optical disc 14 at the predetermined position. The magneto-optical disc 14, mounted at the predetermined position on the shaft 3, is driven as the spindle motor drives the rotary shaft 3. At the demounting, the magneto-optical disc 14 can be displaced from the disc clamp 10 by applying a force to the cassette case along a direction opposite to direction P.

The specification of the disc drive spindle motor, including its dimensions and functions follows:

(1) Because of the restriction on the total height of the disc driving apparatus and the necessity to mount the magneto-optical disc on the spindle motor together with the disc cassette case, the axial length L2 as shown in FIG. 2 must be as short as possible (for example, L2 should be less than 23 mm);

(2) The spindle motor must drive a magnetooptical disc at a constant and fixed rotation speed (1800 rpm); and (3) The tilt of the motor driven rotary shaft 3 and rolling of the disc plane must be very small when the magneto-optical disc is mounted and driven by the motor. (Permissible rolling value at the outer peripheral edge of a magneto-optical disc is less than 0.1 mm, the converted value in terms of shaft oscillation is less than 10 microns).

However, it is difficult to completely satisfy the above required specifications by the conventional construction of the spindle motor. The detailed reasons for this unsatisfactory condition will be described.

(1) Because a disc clamp 10 is mounted on the rotary shaft of the motor as a discrete or individual part, the total axial length L2 of the motor becomes too long to satisfy the specifications in the design of the motor. In order to solve the short-comings of the prior art, a small, strong magnet, having a large magnetic attractive force, can be employed for the disc attracting magnet 12, resulting in a corresponding shortened size of the disc clamp 10. However, the strong magnet is expensive, resulting in increased total cost of manufacturing the motor.

(2) In a conventional motor, the rotor yoke 4 and the disc clamp 10 are mounted on both ends of the rotary shaft separately, with bearings 2 between them as shown in FIG. 2, increasing rotary unbalance, resulting in the generation of shaking and vibration. For practical reasons, the motor products are shipped after the rotary balance of the motors has been adjusted. The separately mounted two rotating bodies, rotor yoke 4 and disc clamp 10, create difficulty in balancing them. It is nearly impossible to obtain a complete balance by the adjustment described above. Therefore, some unbalanced condition will always exist between the rotary parts of the rotor yoke 4 and the disc clamp 10. Depending on the degree of the unbalance or maladjustment, the precession is induced to cause the rotary shaft to vibrate severely.

(3) As the fit length of the rotor yoke 4 and the rotary shaft 3 is designed small in order to shorten the total axial size of the motor, the axis of the rotor yoke 4 tends to have some angle to the axis of the rotary shaft 3 for some fitting allowances when assembled. This results again in shaft vibration.

(4) Since the disc clamp 10 is an individual part separate from the motor proper, the number of parts to be assembled in manufacturing the spindle motor and the number of the motor manufacturing steps is increased, resulting in increased cost of the motor.

SUMMARY OF THE INVENTION

Accordingly, a primary objective of this invention is to provide an improved spindle motor used to drive magneto-optical discs.

Another object of the present invention is to provide a spindle motor wherein a stator coil is positioned so as to face the rotor side field magnet, separated by a small axial gap between them.

A further object of the present invention is to provide a spindle motor wherein rotary parts are arranged on the circumferential portion of the motor, with a saucer-like clamping rotor made of a non-magnetic material for mounting the magneto-optical disc at the side or end of the rotary shaft, on which end the magneto-optical disc is mounted and fixed, and wherein the field magnet is installed at the reverse face of the clamping rotor in order to attract the magneto-optical disc.

These and other objects are achieved by a spindle motor for driving a magneto-optical disc, being of compact size, comprised of a non-magnetic clamping rotor, a set of stator coils, and a series of miniature field magnets which are internally mounted in the clamping rotor, wherein the magneto-optical disc is held in a predetermined position at the end portion of a motordriven rotary shaft by the magnetic force of the internally-mounted field magnets which attracts the mounting disc of magnetic material attached to the magneto-optical disc.

BRIEF DESCRIPTION OF THE DRAWINGS

The manner by which the above objects, and other objects, features, and advantages of the present invention are achieved will be fully apparent from the following detailed description when it is considered in view of the drawings, wherein.

DETAILED DESCRIPTION OF THE PREFERRED EMBODIMENT

According to the improved spindle motor of the present invention, when the magneto-optical disc is inserted on the end of the rotary shaft and mounted on the shaft, a mounting disc of magnetic material is attracted to the magnets and the face of the magneto-optical disc is engaged with the mounting face of the clamping rotor, resulting in the magneto-optical disc being securely held at its predetermined position. Instead of the rotor yoke and the disc clamp being separately installed on the rotary shaft as individual parts, a clamping rotor is installed on the rotary shaft with internally mounted field magnets also used for attracting the mounting disc attached to the magneto-optical disc. As a result, compared to the construction of the conventional motor, the total axis size of the motor is consequently shortened by the total length of the rotor yoke, and the disc attracting magnet that are omitted. In addition, the number of parts and manufacturing steps is reduced. Also, as these rotary members are installed collectively on the rotary shaft, it is a simple matter to adjust the rotary balance, to reduce shaft shaking and vibration.

Figure 1:
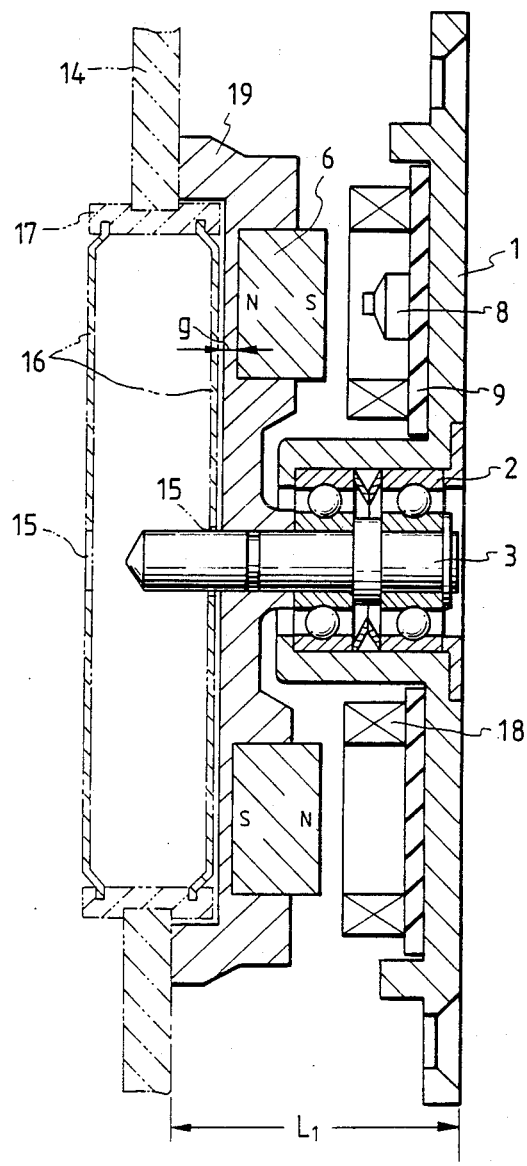
FIG. 1 is a sectional view of one embodiment of the spindle motor for driving magneto-optical discs according to the present invention.

Referring now to the drawings, wherein like reference characters designate like or corresponding parts in both figures, FIG. 1 shows an embodiment of a spindle motor for driving a magneto-optical disc according to the present invention.

FIG. 1 shows an axial-gap type motor having a stator coil and a permanent field magnet, which are opposed to each other and have an axial gap between them. In detail, at the side of a ferromagnetic material shield 1 constituting a part of the magnetic path, there are provided flat stator coils 18 functioning as armature coils, each of which is sector shaped, as seen from the direction of the motor shaft. The coils are situated on a printed substrate 9 and arranged in circumference around a rotary shaft 3 with a regular pitch. In addition, detectors (Hall elements) 8 for detecting the position of magnetic poles of the field magnet are arranged to be parallel with the stator coils 18 and situated at predetermined positions. The field magnets 6 are secured to an end face of a clamping rotor and opposite to the stator coils 18 interposing a small axial gap, to be parallel with the rotary shaft 3. The field magnets 6 are arranged in a ring shape with a predetermined number of magnetic poles. In more detail, the field magnets 6 are a plurality of magnetized regions into which the ring is divided along the circumferential direction. Each magnetized region has a polarity opposite to those of adjacent regions and its N and S poles are disposed in the direction parallel to the axis of the rotary shaft 3.

Figure 2:
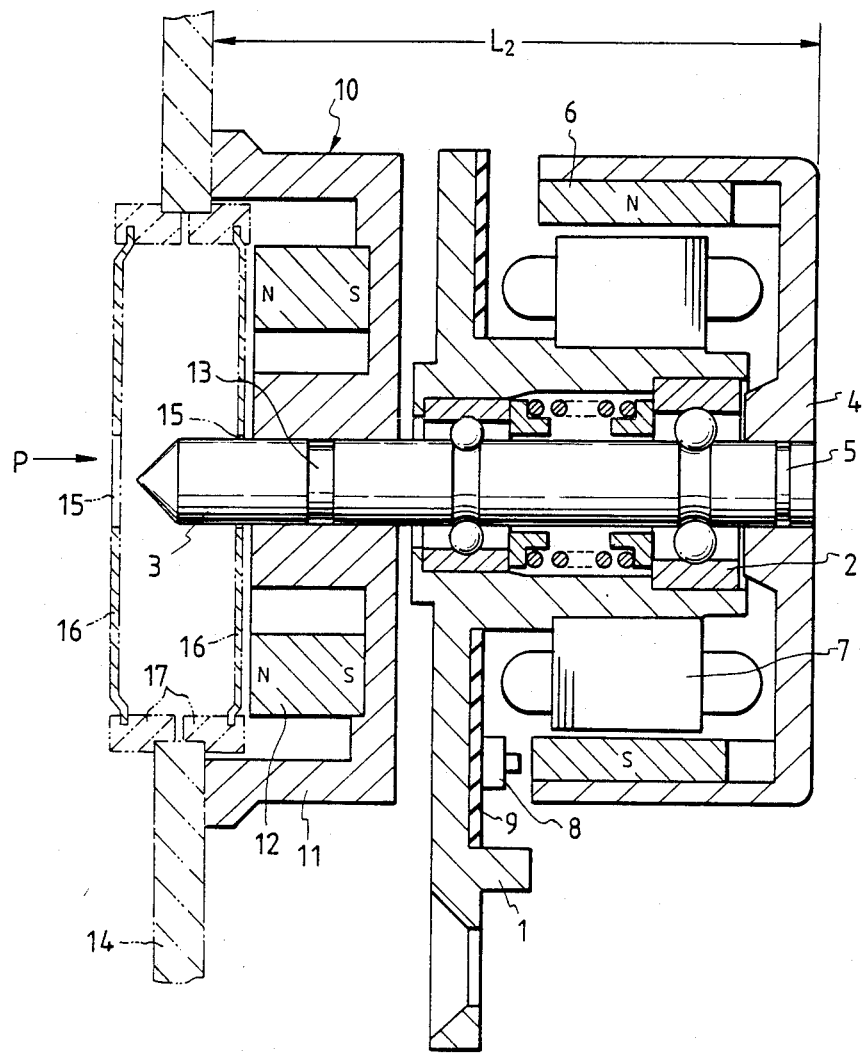
FIG. 2 is a sectional view of a conventional spindle motor.

A saucer like clamping rotor 19 made of a non-magnetic substance is fitted on one side of the rotary shaft 3 where a magneto-optical disc is mounted. The clamping rotor 19 is further firmly attached to the rotary shaft 3 by applying an adhesive. The disc is mounted on the outer edge of the saucer. On the other side of the clamping rotor 19 are provided the several field magnets 6 half buried in the clamping rotor 19. One face of the magnets 6 protrudes toward the stator coils 18 and another face thereof is set quite close to the flat surface of the saucer with a thin wall between them. According to the construction of the spindle motor of the present invention, the dimension L1 measured along the axial direction from the shield 1 to the outer side of the clamping rotor 19 is considerably shortened compared with the similar dimension L2 (shown in FIG. 2) for the conventional apparatus by the length of the rotor yoke 4 and a disc attractive magnet 12 that are omitted. This results in a thinner motor.

With the spindle motor having the above construction, the mounting operation of the magneto-optical disc will be explained. The Hall elements 8 detect the position of the field magnets 6 and determine the rotating angle of the clamping rotor 19. In accordance with the rotating angle thus determined, the timing of supplying current to the stator coils 18 is controlled according to the predetermined sequence. As a result, the motor rotates along a fixed direction at a constant speed.

When a magneto-optical disc 14 is mounted onto an end of the rotary shaft 3, the mounting disc 16 is attracted by the magnetic forces generated by the field magnets 6, and the magneto-optical disc 14 is attracted and secured at the fixed position abutting against the edge face of the clamping rotor 19. When the magneto-optical disc 14 is secured at its fitted position, the mounting disc 16 is positioned in a cylindrical depression of the clamping rotor 19 leaving a small gap between the mounting disc 16 and the flat bottom of the cylindrical depression with a distance (g) between the mounting disc 16 and the bottom face of the field magnets 6.

According to the construction of the preferred embodiment, there is no rotor yoke 4 applied to the magnets 6. Thereby, with no magneto-optical disc fitted, a magnetic circuit including the magnets 6 is open and its operative permeance as a reciprocal of the magnetic resistance is relatively small. However, by mounting the magneto-optical disc 14 on the spindle motor of the present invention, the magnetic flux is increased because the mounting disc 16 of magnetic material is inserted in the magnetic circuit of the magnets 6 so that the operative permeance of the magnet 6 is increased. Therefore, with the spindle motor design, the small magnets can be utilized as field magnets 6 by considering this flux increase. It is preferable to employ a high flux permanent magnet, for example rare earth magnets, in order to make field magnets 6 further smaller. However, some design factors may allow the use of ordinary permanent magnets, for example, a ferrite series permanent magnet, to be employed with the motor.

The excellent effect obtained when the spindle motor is manufactured according to the present invention will be described.

The disc-driving spindle motor has stator coils and rotor side field magnets arranged on the periphery of the rotor so as to face each other, across an axial gap between them. Additionally, the saucer-like clamping rotor is attached on the side of the rotary shaft wherein the magneto-optical disc is mounted, and wherein the field magnet is applied opposite of the disc mounting side of the clamping rotor in order to further attract the magneto-optical disc. The spindle motor of the present invention can achieve its purpose without a rotor yoke and a magnet exclusively used to attract the magneto-optical disc, as employed in the conventional spindle motor. In consequence, the dimension L1, approximately equal to the shaft length of the motor, is reduced considerably compared with the corresponding dimension L2 of the conventional motor, and the number of parts and manufacturing steps of the motor are considerably reduced. In addition, rotary parts, such as the clamping rotor and the magnet are integrally fixed on the rotary shaft, to make it very easy to adjust the rotary balance of the parts of the motor and result in a significant reduction in the fluctuation or rolling of the disc face, shaft shaking, and parts vibration during rotation of the magneto-optical disc.

Although only one embodiment of the invention has been disclosed and described, it is apparent that other embodiments and modifications of the invention may be made without departing from the spirit or scope of the present invention as set forth in the appended claims.

What is claimed is:

1. A spindle motor for driving a magneto-optical disc, being of compact size, comprised of a non-magnetic clamping rotor having an upper and lower face, a set of stator coils, and a plurality of field magnets which are internally mounted abutting said lower face of the clamping rotor, operative to fixedly hold said magneto-optical disc in a non-contacting manner with respect to said field magnets and in a predetermined position at an end portion of a motor driven shaft by a magnetic flux of said internally-mounted field magnets which attract a mounting disc of magnetic material attached to said magneto-optical disc.

2. A spindle motor as claimed in claim 1, wherein said field magnets are mounted in a ring at the rotor side of said motor-driven rotary shaft, and said stator coils and said field magnets are arranged on the periphery of the motor so as to oppose each other, across an axial gap, said spindle motor further including Hall elements for detecting magnetic pole position, said field magnets for both driving said clamping rotor and providing magnetic attraction to said mounting disc.

3. A spindle motor as claimed in claim 2, wherein said clamping rotor is saucer-like and adapted to have said mounting disc mounted thereon, is made of nonmagnetic material and is positioned at the disc end of the rotary shaft.

* * * * *